United States Patent [19]

Brook et al.

[11] Patent Number: 4,465,778
[45] Date of Patent: Aug. 14, 1984

[54] SINTERABLE FLUORITE OXIDE CERAMICS

[75] Inventors: Richard J. Brook; Suxing Wu, both of Leeds, England

[73] Assignee: National Research Development Corporation, London, England

[21] Appl. No.: 457,871

[22] Filed: Jan. 14, 1983

[30] Foreign Application Priority Data

Feb. 3, 1982 [GB] United Kingdom ............... 8203113

[51] Int. Cl.³ ..................... C04B 35/04; C04B 35/48
[52] U.S. Cl. ..................................... 501/104; 501/94; 501/121; 501/123; 501/135; 501/152
[58] Field of Search ............... 501/104, 108, 121, 135, 501/94, 123, 152; 423/263, 266, 252, 608; 429/33

[56] References Cited

U.S. PATENT DOCUMENTS 3,350,230 10/1967 Tannenberger et al. ....... 501/104 X
3,574,645 4/1971 Anderson ........................... 501/94
4,219,359 8/1980 Miwa et al. ..................... 501/104 X

FOREIGN PATENT DOCUMENTS 56-14474 2/1981 Japan .................................. 501/104
924966 5/1963 United Kingdom ............... 501/104

Primary Examiner—John Doll
Assistant Examiner—Steven Capella
Attorney, Agent, or Firm—Oblon, Fisher, Spivak, McClelland & Maier

[57] ABSTRACT

Zirconia $ZrO_2$, ceria $CeO_2$ or thoria $ThO_2$ may be rendered ionically conductive; a typical composition is $ZrO_2 + 12$ mol % CaO.

This is sintered in the solid state as a 40 nm powder using as a sintering additive 0.1 mol % MgO at 1450 C. for 4 hours; a density 98% of the theoretical is achieved.

For other fluorite oxide compositions, MgO is also useful as a sintering additive but in different proportions.

22 Claims, 1 Drawing Figure

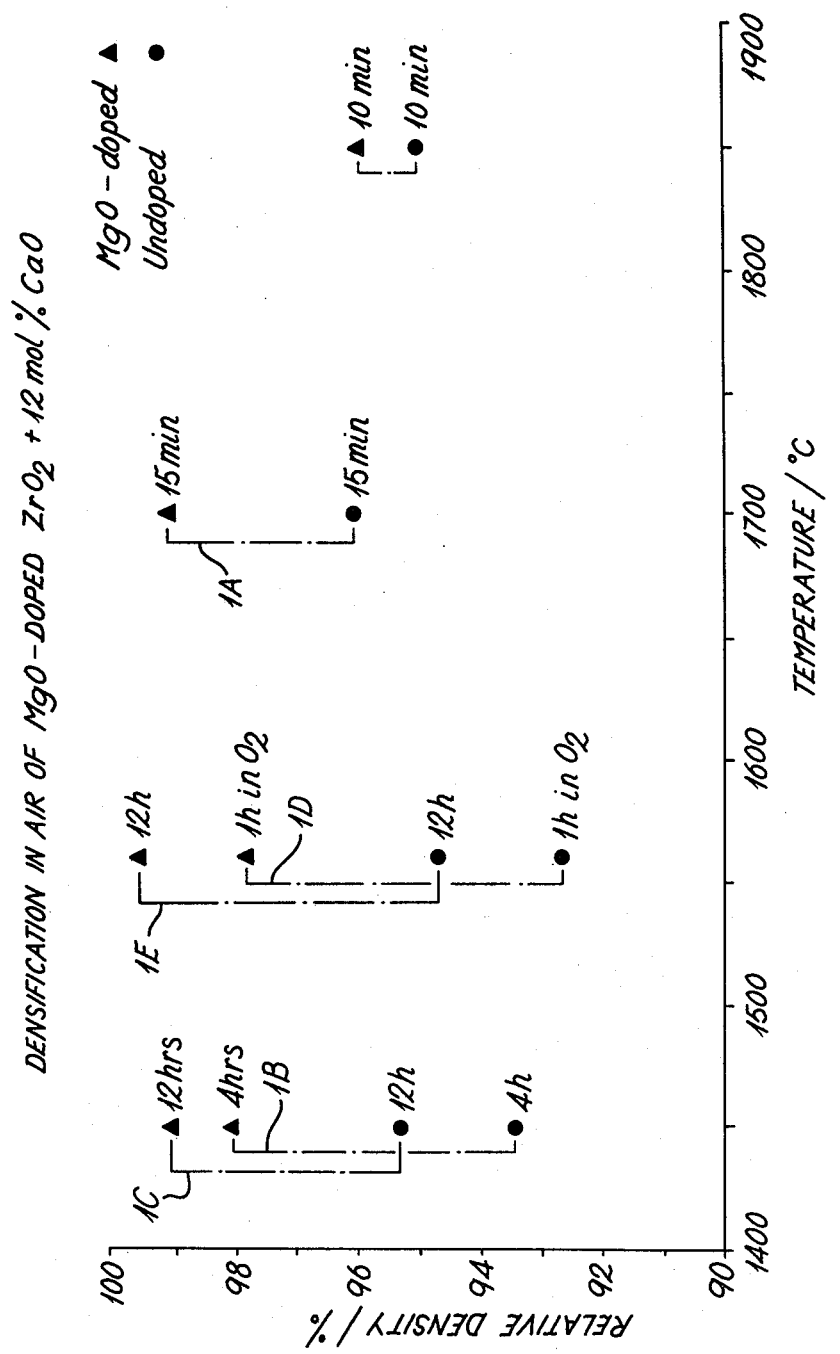

SINTERABLE FLUORITE OXIDE CERAMICS

BACKGROUND OF THE INVENTION

1. Field of the Invention

This invention relates to sinterable compositions of fluorite oxides for making ceramic bodies, and to a method of making ceramic bodies from such compositions. The fluorite oxides include zirconia $ZrO_2$, ceria $CeO_2$ and thoria $ThO_2$, and, for the purposes of this specification, include solid solutions between two or more fluorite oxides, for example zirconia containing a minor proportion of hafnia ($HfO_2$), a common impurity in solid solution.

2. Description of the Prior Art

Zirconia has attracted attention as an ionic conductor which may be used in oxygen monitors, fuel cells and batteries. The ionic conductivity is typically conferred by a 12 mol % substitution of zirconium oxide by calcium oxide CaO (lime), yielding a defect structure permitting oxygen-ion diffusion, and also serving to suppress the monoclinic-to-tetragonal phase transformation which pure zirconia undergoes on heating to about 1200 C. and which can lead to disintegration of a zirconia object.

Other zirconia compositions known as ionic conductors are $ZrO_2$ containing 8 mol % yttria $Y_2O_3$ (more expensive, but displaying good conductivity and stability against ageing), $ZrO_2$ containing scandia $Sc_2O_3$ (even more expensive, but having excellent conductivity) and $ZrO_2$ containing rare earth oxides. Zirconia may also be stabilised by mixtures of such materials. Zirconia containing 12 mol % CaO or 8 mol % $Y_2O_3$, wherein the 1200 C. phase transformation is regarded as fully suppressed, is accordingly known as 'stabilised zirconia'. Smaller amounts of CaO, e.g. 6 mol %, do not fully suppress the transformation, and such compositions are described as 'partially stabilised'.

Other fluorite oxide compositions known as good ionic conductors are ceria containing gadolinia or yttria, and thoria containing yttria. These have cubic structures under all conditions, and the above considerations about 'stabilisation' do not arise.

All these compositions share the problem that they are difficult to sinter.

Sintering methods which are available include hot pressing, which is limited to certain shapes and is expensive. Special coprecipitated powders and special techniques such as hydrothermal in situ oxidation or hot isostatic pressing may be used, but increase the cost substantially. Liquid-phase additives are a common expedient, e.g. (for zirconia with lime) 2 mol % alumina $Al_2O_3$ or 5 mol % titania $TiO_2$, but have a significantly damaging effect on the conductivity of the zirconia, and (since they act by forming boundary films around the zirconia particles) increase grain boundary creep at high temperatures. Therefore this method, while economical and useful for various applications, is disadvantageous where good mechanical properties at high temperatures or good ionic conductivity are important.

The best sintering method in theory would use a solid-state additive, i.e. an additive which goes into solid solution in the host. In such a method, no liquid is formed during sintering and the creep strength, conductivity and stability of the material are unaffected. For solid-state sintering of alumina, for example, it is known to add ¼ weight % nickel oxide NiO or ¼ weight % magnesia MgO. Such systems are not however easy to find, and none has been known, so far as we are aware, for stabilised zirconia.

Solid-state additives have commonly been claimed to work by influencing the defect structure of the host, whereby vacancies or interstitials are created in the host lattice, permitting rapid diffusion and hence sintering. However, stabilised zirconia already has high defect concentrations, from (for example) 12 mol % CaO creating vacancies, yet it still sinters poorly. This instance shows that experience with other solid-state additive systems does not help us in selecting a system for zirconia.

SUMMARY OF THE INVENTION

Therefore, a need still exists for improved sinterable compositions of fluorite oxides for making ceramic bodies, and for a method of making ceramic bodies from such compositions.

It is an object of the present invention to provide a sinterable composition of fluorite oxide comprising fluorite oxide, which may be partially or fully stabilised, of particle size preferably not exceeding 1 micron (preferably not exceeding 0.4 micron, most preferably not exceeding 0.1 micron), characterised in that it contains 0.05 to 1.0 mol % MgO. The fluorite oxide is preferably one of $ZrO_2$, $CeO_2$ and $ThO_2$. In the case of $ZrO_2$ (which may include $HfO_2$), it may be stabilised preferably by 6 to 16 mol % (more preferably 10 to 14 mol %) CaO or 2 to 12 mol % (more preferably 6 to 10 mol %) $Y_2O_3$; where CaO is the stabiliser, the MgO content is preferably from 0.05 to 0.15 mol %, more preferably from 0.08 to 0.12 mol %. Where $Y_2O_3$ is the stabiliser for $ZrO_2$, used in an amount of 5 mol %, the MgO is preferably present in an amount of 0.4 to 1.0 mol %. Where 7% $Y_2O_3$ is the stabiliser for $ZrO_2$, the MgO is preferably present in an amount of 0.2 to 0.5 mol %.

Thus, although the range for MgO is 0.05 to 1.0%, not all parts of this range are equally preferred. Different parts are preferred for different hosts, and for different stabilisers, as may be seen from the foregoing, and other variables may affect the optimal proportion of MgO even more significantly in any particular case, such as particle size, homogeneity and purity.

It is a further object of the present invention to provide a method of making a ceramic body from a foregoing composition comprises sintering a shaped body of the composition, preferably in air but optionally in an atmosphere of gas soluble in fluorite oxide, such as in oxygen, at a temperature below which any liquid forms until the density of the sintered composition is at least 96% of theoretical density. In the case of zirconia, the temperature is preferably at least 1400 C., and may be up to or above 1600 C. and is preferably not more than 1800 C. The duration of the sintering is preferably at least 5 minutes at temperatures from 1600 C. upwards, and preferably at least 1 hour (for temperatures up to 1500 C. or 1600 C.). With powders coarser than 1 micron, MgO continues to have an effect, but the maximum densities achievable in any realistic sintering time will be low. The optimum temperature will be much influenced by the grain size of the fluorite oxide powder used; coarser powders in general need higher temperatures. However, MgO shows its greatest effect at temperatures not exceeding 1700 C. and, as a general guide, works best for fine powders at modest temperatures.

The body may be shaped, prior to the sintering, by any suitable method for making a green compact, for example isostatic pressing for a minute under 56 MPa at room temperature.

The invention extends to the ceramic body so made from the composition.

The invention will now be described by way of example.

The accompanying drawing shows the density improvement obtained, at various sintering temperatures in selected examples, by adding magnesia.

Having generally described the invention, a more complete understanding can be obtained by reference to certain specific examples, which are provided herein for purposes of illustration only and are not intended to be limiting unless otherwise specified.

EXAMPLES

Example 1A

A powdered sample (powder size 40 nm) of zirconia $ZrO_2$ containing 12 mol % lime CaO was thoroughly mixed with 0.10 mol % (based on the total) of magnesia MgO. The mixture was formed to a desired shape viz. a tube, by isostatic pressing under 56 MPa at room temperature.

The tube was sintered in air at 1700 C. for 15 minutes in an alumina-lined furnace. At that temperature, no liquid phase arises. The grain size of the body so produced was regular, deviating little from 10 $\mu$m. The density of the body was 99% of theoretical. A body produced identically except that it had only 5 minutes' sintering had a density of 96%.

A body again produced identically (15 minutes' sintering) but containing only 0.05 mol % MgO had a density of 96%.

The densities of comparative samples sintered at 1700 C. for 15 minutes are as follows:

$ZrO_2$ + 12 mol % CaO + nil MgO: 95%

$ZrO_2$ + 12 mol % CaO + 0.20 mol % MgO: 94%

$ZrO_2$ + 12 mol % CaO + 0.10 mol % BaO: 93%

$ZrO_2$ + 12 mol % CaO + 0.10 mol % $Al_2O_3$: 90%

The difference between 90% or 93% density and 98% or 99% (i.e. the difference between 10% or 7% porosity and 2% or 1% porosity) can be important for applications where the material is used as an ion-conducting membrane (e.g. in fuel cells or monitors) since a damaging degree of permeability to gases can be found at the lower densities.

Example 1B

A powdered sample (powder size 40 nm) of zirconia $ZrO_2$ containing 12 mol % lime CaO was thoroughly mixed with 0.10 mol % (based on the total) of magnesia MgO. The mixture was formed to a desired shape as before and sintered in air at 1450 C. for 4 hours. This temperature can be reached using silicon carbide heating elements, which are reasonably inexpensive.

The resulting body had sintered to a density of 5.61 $Mg/m^3$, i.e. 98% of theoretical full density. The density of a comparative sample, prepared identically in all respects except that the magnesia was omitted, was 5.3 $Mg/m^3$, i.e. 93% of theoretical.

Example 1C

Example 1B was repeated, the only difference being that sintering was continued for 12 hours instead of 4 hours. The density of the resulting body was now 5.64 $Mg/m^3$ (99% of theoretical). A comparative sample, lacking the magnesia but otherwise identical, had a density of 5.41 $Mg/m^3$ (95% of theoretical).

Examples 1D and 1E

Example 1B was repeated, the only differences being that sintering was conducted at 1560 C. (regarded as the absolute maximum for silicon carbide heating elements) for a duration (Example 1D) of 1 hour in oxygen or (Example 1E) 12 hours in air. Oxygen was used to avoid any problem arising from nitrogen (from air) becoming trapped in the pores of the zirconia and thus preventing full densification; oxygen is soluble in zirconia. Such measures would in practice be used only when the very highest possible densities were desired.

The densities achieved in these Examples are as follows, with the results from comparative examples (identical except that they lack the magnesia) shown in brackets:

Example 1D: 5.55 $Mg/m^3$ = 97.8% of theoretical (5.26 $Mg/m^3$ = 92.6%)

Example 1E: 5.65 $Mg/m^3$ = 99.5% of theoretical (5.38 $Mg/m^3$ = 94.9%)

The results of Examples 1A–1E are summarised on the accompanying drawing, which also shows, for interest, self-explanatory results obtained at 1850 C. (not described in the text).

Example 2A

A powdered sample (powder size 40 nm) of zirconia $ZrO_2$ containing 7 mol % yttria $Y_2O_3$ was thoroughly mixed with 0.30 mol % (based on the total) of magnesia MgO. The mixture was formed to a desired shape as before and sintered in air at 1700 C. for 20 minutes. At that temperature, no liquid phase arises.

The grain size of the body so produced was regular, deviating little from 10 $\mu$m. The density of the body was 5.69 $Mg/m^3$ (96.4% of theoretical). A body produced identically except that it had only 5 minutes' sintering had a density of 5.60 $Mg/m^3$ (94.9%).

The density of a comparative sample of $ZrO_2$ + 7 mol % $Y_2O_3$ + nil MgO sintered at 1700 C. for 20 minutes was 5.57 $Mg/m^3$ (94.4%).

EXAMPLES 2B to 2D

Example 2A was repeated, except that the amount of magnesia MgO, and the resulting density in each case, were:

Example 2B-0.2 mol %-95.7%
(Example 2A-0.3 mol %-96.4%)
Example 2C-0.4 mol %-96.1%
Example 2D-0.5 mol %-96.0%

Example 3A

A powdered sample (powder size 40 nm) of zirconia $ZrO_2$ containing 5 mol % yttria $Y_2O_3$ was thoroughly mixed with 0.5 mol % (based on the total) of magnesia MgO. The mixture was formed to a desired shape as before and sintered in air at 1450 C. for 12 hours.

The density of the resulting body was 5.84 $Mg/m^3$ (98% of theoretical). The density of the comparative sample $ZrO_2$ + 5% $Y_2O_3$ + nil MgO sintered at 1450 C. for 12 hours was 5.7 $Mg/m^3$ (95% of theoretical).

Examples 3B to 3E

A powdered sample (powder size 40 nm) of zirconia $ZrO_2$ containing 5 mol % yttria $Y_2O_3$ was thoroughly mixed with magnesia MgO in a porportion listed below. The mixture was formed to a desired shape as before and sintered in air at 1700 C. for 30 minutes.

The proportion of MgO and the resulting density (in terms of theoretical density-100%=5.90 Mg/m$^3$) in each case were:

Example 3B-0.4 mol %-98.3%
Example 3C-0.5 mol %-99.0%
Example 3D-0.6 mol %-98.5%
Example 3E-1.0 mol %-98.3%

Having now fully described the invention, it will be apparent to one of ordinary skill in the art that many changes and modifications can be made thereto without departing from the spirit or scope of the invention as set forth therein.

What is claimed as new and desired to be secured by Letters Patent of the United States is:

1. A composition of fluorite oxide sinterable in the solid state, comprising a fluorite oxide, which may be partly or fully stabilised, characterised in that it contains 0.05 to 0.15 mole % MgO and substantially no $Al_2O_3$.

2. A composition according to claim 1, wherein the particle size of the fluorite oxide does not exceed 1 micron.

3. A composition according to claim 2, wherein the said particle size does not exceed 0.4 micron.

4. A composition according to claim 3, wherein the said particle size does not exceed 0.1 micron.

5. A composition according to claim 1, wherein the fluorite oxide is chosen from the group consisting of $ZrO_2$ (which may include $HfO_2$), $CeO_2$ and $ThO_2$, and a single-phase solid solution between at least two oxides thereof.

6. A composition according to claim 5, wherein the fluorite oxide is $ZrO_2$ further comprising from 6 to 16 mol % of CaO.

7. A composition according to claim 6, wherein the CaO content is from 10 to 14 mol %.

8. A composition according to claim 1, wherein the MgO content is from 0.08–0.12 mole %.

9. A composition of fluorite oxide sinterable in the solid state wherein the fluorite oxide is $ZrO_2$ (which may include $HfO_2$) further comprising from 2 to 12 mole % $Y_2O_3$, 0.2 to 1.0 mole % MgO and substantially no $Al_2O_3$.

10. A composition according to claim 9, wherein the $Y_2O_3$ content is from 6 to 10 mol % and the MgO content is from 0.2 to 0.5 mol %.

11. A composition according to claim 9, wherein the MgO content is from 0.4 to 1.0 mol %.

12. A composition according to claim 11, wherein the $Y_2O_3$ content is substantially 5 mol %.

13. A method of making a ceramic body from a composition according to claim 1, comprising sintering a shaped body of the composition at a temperature below which any liquid forms until the density of the sintered composition is at least 96% of theoretical density.

14. A method according to claim 13, wherein the sintering is performed under a condition selected from the group consisting of an atmosphere of gas soluble in the fluorite oxide, and an atmosphere of air.

15. A method according to claim 13, wherein the sintering temperature is above 1,600° C. and not more than 1,800° C. and wherein the duration of the sintering is at least 5 minutes.

16. A method according to claim 13, wherein the sintering temperature is at least 1,400° C. and up to 1,600° C. and wherein the duration of the sintering is at least 1 hour.

17. A sintered fluorite oxide body of the composition according to claim 1.

18. A method of making a ceramic body from a composition according to claim 9, comprising sintering a shaped body of the composition at a temperature below which any liquid forms until the density of the sintered composition is at least 96% of theoretical density.

19. A method according to claim 18, wherein the sintering is performed under a condition selected from the group consisting of an atmosphere of gas soluble in the fluorite oxide, and air.

20. A method according to claim 18, wherein the sintering temperature is above 1,600° C. and not more than 1,800° C. and wherein the duration of the sintering is at least 5 minutes.

21. A method according claim 18, wherein the sintering temperature is at least 1,400° C. and up to 1,600° C. and wherein the duration of the sintering is at least 1 hour.

22. A sintered fluorite oxide body of the composition according to claim 9.

* * * * *